3,413,793
SHEAVE CAPSTAN ASSEMBLY FOR CABLE
TAKEUP APPARATUS
Ralph M. Stine, Kenmore, and Herbert E. Weller, Williamsville, N.Y., assignors to Western Electric Company, Incorporated, New York, N.Y., a corporation of New York
Filed Apr. 29, 1966, Ser. No. 546,303
21 Claims. (Cl. 57—68)

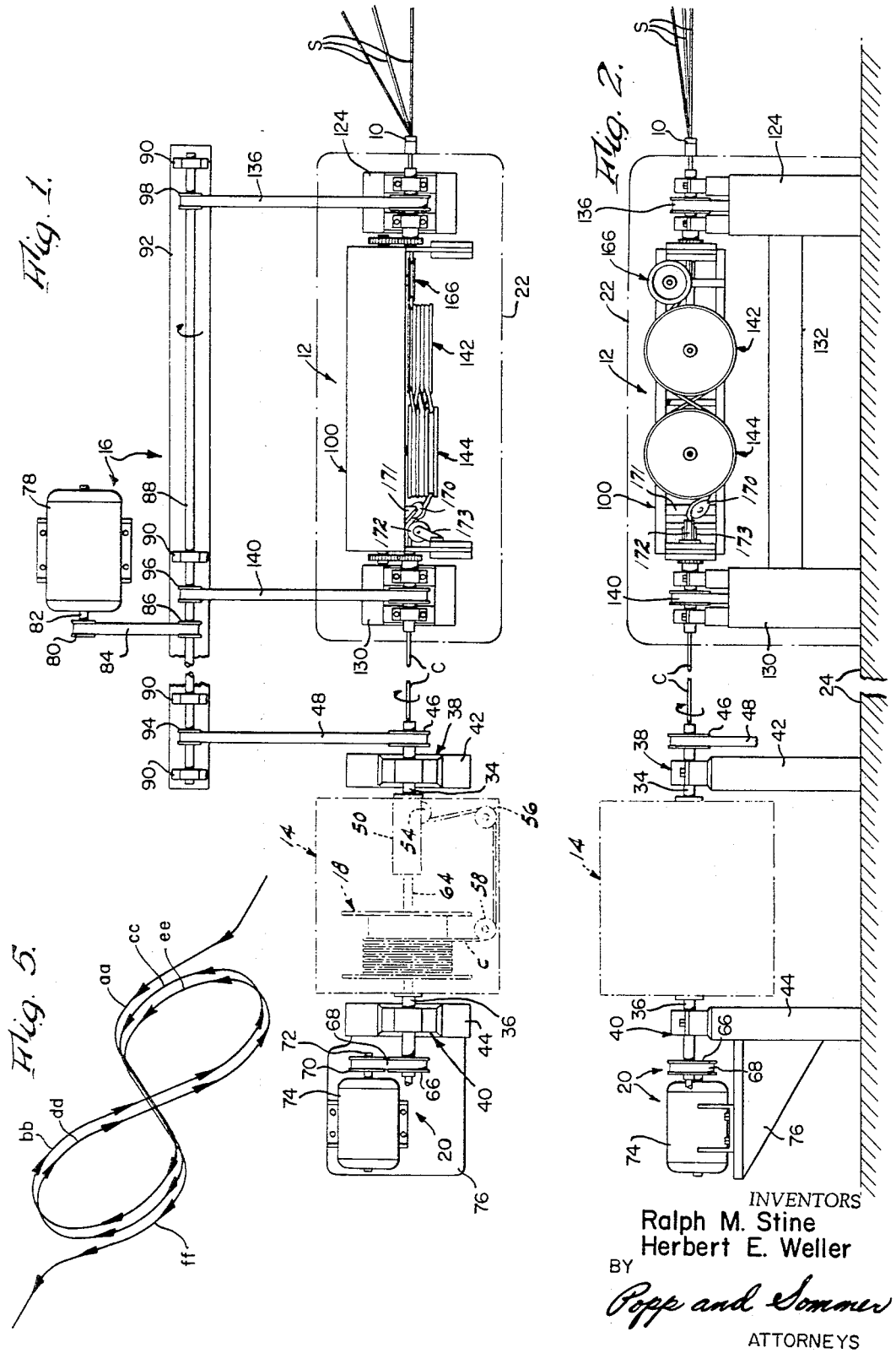

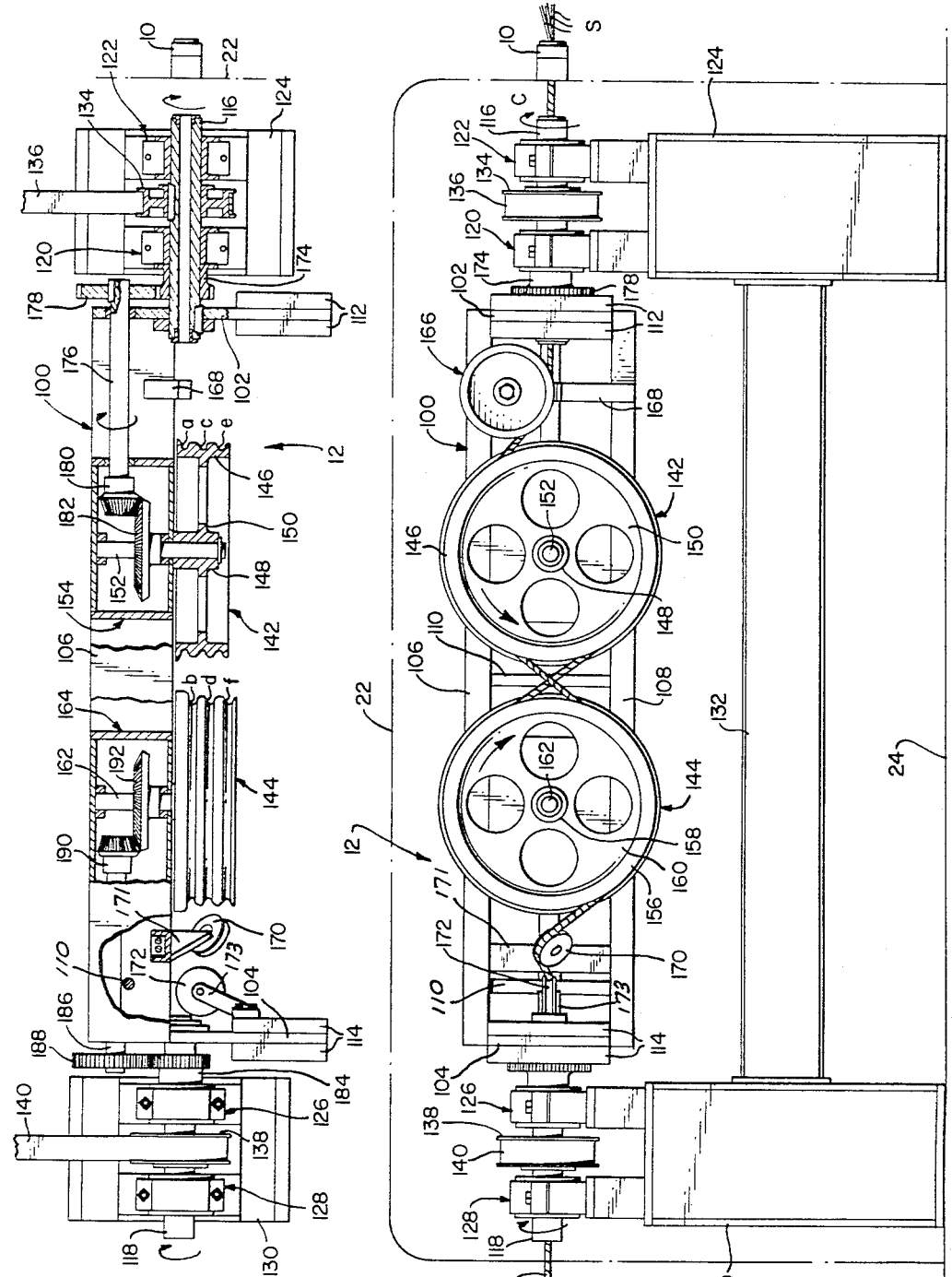

ABSTRACT OF THE DISCLOSURE

The disclosure concerns a sheave capstan assembly for twisting cable fed from a forming die to takeup means wherein the latter rotates with the capstan assembly about the die axis. The capstan assembly carries a pair of sheaves which provide a figure 8 cable path while the cable travels along the capstan. The cable is twisted between the die and the first sheave. The sheaves are driven by transmission means to rotate in opposite directions about parallel axes transverse to the die axis as the capstan rotates to provide the major portion of pulling force required for twisting and feeding the cable from the die. The sheave drive transmission means is an integral part of the capstan assembly.

---

The present invention relates to improvements in cable takeup apparatus, and more particularly to a new and improved sheave capstan assembly for twisting and feeding cable, such as telephone switchboard connector cable, from a cable forming die to a takeup flyer.

In conventional apparatus for taking up such connector cable on a reel, a plurality of wire strands are fed to a cable forming die. As the cable emerges from the die it is fed through a tractor capstan to impart the desired twist to the cable, then through a takeup flyer which is rotated about the cable or die axis with the tractor capstan to maintain such twist, and finally is wound on a takeup reel which rotates about its own axis as the flyer rotates about the reel.

The maximum takeup speed of the cable is limited by the rotational speed of the tractor capstan which has a large mass. A high rotational speed of the tractor capstan creates substantial centrifugal forces which tend to deform the cleats on the tractor chains and to cause the chains to bellow outwardly. Thus, the tractor capstan is limited to a rotational speed of about 200 r.p.m. (revolutions per minute) and the cable takeup speed is limited to about 240 f.p.m. (feet per minute).

Furthermore, as the takeup reel builds up to speed at the start of operation, compressive forces are exerted on the end of the cable for the first dozen or so revolutions, because the reel is providing most, if not all, of the pulling force on the cable. This results in undesirable damage to the cable and increases production costs.

Accordingly, an object of the present invention is to provide a new and improved sheave capstan assembly which can be operated at substantially higher rotational and cable takeup speeds, and which will not damage the cable, thereby substantially reducing production costs.

Another object is to provide such sheave capstan assembly which is so designed that the rotational speed of the assembly and flyer and the takeup speed of the cable are increased to more than twice the corresponding speeds of such conventional tractor capstan, namely a rotational speed of about 500 r.p.m. and a takeup speed of about 530 f.p.m. The reason for this is that such sheave capstan assembly has less mass, fewer parts and no chains or shoes; therefore, it can withstand higher centrifugal forces than the tractor capstan, permitting rotation at such higher speed.

A further object is to provide such sheave capstan assembly which is so designed, and wherein the cable is fed around the sheaves in such a path, that the capstan assembly provides most of the pulling force for taking up the cable, rather than the reel, thereby avoiding damage to the cable and permitting a faster takeup speed. Preferably, the capstan assembly provides 75% of such pulling force, leaving only 25% for the reel.

In a preferred embodiment of the invention, a sheave capstan assembly is provided wherein the cable is fed about a pair of sheaves in a figure 8 path. The sheaves are mounted on an elongated frame rotatable about its longitudinal axis. The sheaves, in turn, are rotatable about parallel transverse axes intersecting the longitudinal axis. As indicated above, this arrangement enables the twisting and feeding of the cable at higher speeds without damage to the cable.

The invention will be more fully understood by reference to the following detailed description and accompanying drawings, wherein;

FIG. 1 is a top plan view of a cable takeup apparatus incorporating a preferred embodiment of the inventive sheave capstan assembly;

FIG. 2 is a front elevational view of such apparatus;

FIG. 3 is an enlarged top plan view of such preferred embodiment, with portions broken away in section to illustrate structural details;

FIG. 4 is a front elevational view of the embodiment of FIG. 3, and

FIG. 5 is a schematic perspective view of the preferred double figure 8 path of the cable around the sheaves.

Referring to the drawings, and particularly FIGS. 1 and 2, there is shown an apparatus for taking up cable C, a typical example of which is telephone switchboard connector cable. The illustrated apparatus includes a cable forming die 10 into which the several cable forming strands S are fed, and as the cable C emerges from the die along the longitudinal axis of the die (also referred to as the cable axis), it is fed through the inventive sheave capstan assembly 12 to impart the desired twist to the cable. Continuing along its axis, cable C is fed by assembly 12 through a flyer 14 which is rotated about the cable axis with sheave capstan assembly 12 by a common motorized drive 16, in order to maintain the desired twist in the cable. Finally, cable C is wound on takeup reel 18 which is rotated at an appropriate speed about its own axis (here shown as coincidental with the longitudinal die or cable axis) by its motorized drive 20, as flyer 14 rotates about the reel.

Cable forming die 10 is preferably mounted on a protective housing 22 surrounding sheave capstan assembly 12, this housing being shown schematically in broken lines for simplicity and clarity. Housing 22, assembly 12, drive 16 and flyer 14 are suitably mounted on a foundation or floor 24.

Flyer 14, which may be of any suitable construction, is shown schematically as being mounted on a pair of central hollow stub shafts 34, 36 suitably supported in bearings 38, 40 mounted respectively on upright bearing blocks or posts 42, 44. Cable C passes through shaft 34 on which is fixed pulley 46 driven by belt 48 from motorized drive 16 for rotating the flyer.

A hollow central hub 50 communicates with shaft 34. A pulley 54 is rotatably supported for guiding cable C as it emerges from the adjacent open side of hub portion 50 to rotatably mounted pulleys 56 and 58.

Reel 18, which may be of any suitable construction, is mounted on and rotates with shaft 64 which has one end journalled in a bearing recess in hub 50 and its other end passing freely through hollow stub shaft 36 for mounting pulley 66. This pulley is driven by belt 68 on pulley 70 fast on shaft 72 of reel drive motor 74 mounted on a support 76 suitably secured to bearing post 44.

Reel shaft 64 can be reciprocated in shaft 36 relative to pulley 66 by any suitable means (not shown) connected to the left end of shaft 64. Likewise, flyer 14 can be provided with a protective housing (not shown).

Continuing with FIGS. 1 and 2, the common drive 16 for flyer 14 and sheave assembly 12, likewise may be of any suitable construction, but is shown as including a motor 78 mounted on floor 24 and having a driving pulley 80 mounted on its drive shaft 82 for driving a belt 84 trained over pulley 86 on an elongated jack shaft 88 suitably journalled in bearings 90 on an elongated frame or support 92 fixed on floor 24. Power is taken off jack shaft 88 preferably at three points, with pulley 94 driving belt 48 to complete the transmission for rotationg flyer 14, and with pulleys 96 and 98 completing the dual transmissions for rotating the frame of sheave capstan assembly 12 together with flyer 14 in the same direction and at the same speed.

The structure so far described is essentially conventional, with the exception of sheave capstan assembly 12, which will now be described in detail by particular reference to FIGS. 3–5. Sheave capstan assembly 12 is shown as composed of an elongated frame 100 arranged between die 10 and flyer 14 for rotation about the cable axis and including a pair of centrally perforated, transverse end walls or plates 102, 104 extending across such axis and connected along one side thereof by an elongated housing including upper and lower longitudinal structural members 106, 108 secured together by several suitable cross-members 110. On the other side of such axis, i.e., the open side of frame 100, end walls 102, 104 are provided respectively with counterbalancing pairs of weights or plates 112, 114.

Central hollow shafts 116, 118 are fixed in and project outwardly through end walls 102, 104 respectively, along such axis, and cable C passes through these shafts as it is fed from die 10 to flyer 14. Shaft 116 is rotatably supported in a pair of split bearings 120, 122 suitably mounted on bearing block or post 124 on floor 24, while shaft 118 is similarly journalled in split bearings 126, 128 on post 130 connected to post 124 by one or more elongated support members 132.

The dual capstan transmissions for rotating frame 100 are identical. The transmission for driving shaft 116 includes pulley 134 fixed on the shaft between bearings 120, 122 and belt 136 trained over pulley 134 and pulley 98 on jack shaft 88. Likewise, the transmission for driving shaft 118 includes pulley 138 fixed on the shaft between bearings 126, 128 and belt 140 trained over pulley 138 and pulley 96 on jack shaft 88. Thus, capstan frame 100 is rotated together with flyer 14 in the same direction and at the same speed by common drive 16, as shown in FIG. 1. This ensures that the desired twist or lay, which is imparted to cable C between die 10 and the first sheave of capstan assembly 12, is maintained as the cable passes through flyer 14 to reel 18. For optimum control of such rotation, it is preferred that belts 48, 136 and 140, and their respective pulleys be provided with teeth (not shown).

Continuing with FIGS. 3 and 4 in particular, a pair of sheaves 142, 144 are mounted on the housing of frame 100 along and adjacent the longitudinal die or cable axis between end walls 102, 104 for rotation about parallel transverse axes intersecting such axis, with sheave 142 being arranged to receive cable C as it emerges from shaft 116 and sheave 144 being arranged to feed the cable to shaft 118. Sheave 142 is provided with preferably three annular peripheral grooves *a, c, e*, with groove *a* lying in a plane containing such longitudinal die or cable axis, while sheave 144 is also provided with comparable grooves *b, d, f*, but effect from grooves *a, b, c*, toward the open side of frame 100 opposite the frame housing.

In order to reduce mass, sheave 142 is preferably formed in one piece to include a wide outer rim or peripheral portion 146 and a hollow central hub 148 connected by a perforated web portion 150, with the hub being fixed on spindle 152 which is journalled within a gear box 154 in the frame housing between members 106, 108. Likewise, sheave 144 is so formed to include rim portion 156, hub 158 and web portion 160, with the hub being fixed on spindle 162 which is similarly journalled in gear box 164.

A first pulley 166 is rotatably mounted on upper member 106 of the frame housing by any suitable means (not shown) between sheave 142 and end wall 102 so that its groove lies in the same plane as groove *a* of sheave 142 and centers on the cable axis for guiding cable C into groove *a* as it emerges from shaft 116. An elongated guide member 168 is suitably mounted on lower member 108 of the frame housing below pulley 166 for supporting cable C when the tension is off the cable. A second pulley 170 is rotatably mounted on the frame housing by any suitable means such as bracket 171 between sheave 144 and end wall 104, and is inclined so that its groove lies in another plane intersecting the cable axis and groove *f* of sheave 144 for guiding the cable from groove *f* toward such axis. A third pulley 172 is rotatably mounted on the inner plate 114 on end wall 104 by any suitable means such as bracket 173 so that its groove lies in the plane of the transverse sheave axes and centers on the cable axis for guiding the cable from pulley 170 along such axis into shaft 118 toward flyer 14.

The preferred dual transmissions for rotating sheaves 142, 144 at the same speed, but in the opposite directions indicated by the arrows in FIG. 4, are composed of the same elements. However, the positions of the elements are reversed. The transmission for driving sheave 142 includes a stationary spur gear 174 mounted on bearing 120 around rotatable shaft 116 and a spindle 176 journalled in end wall 102 and the adjacent end wall of gear box 154 for revolution with frame 100 about the cable or die axis and rotation about its own axis which is parallel to such die axis. Fixed on the outer end of spindle 176 which projects through end wall 102 is a driven spur gear 178 which is engageable with gear 174 for revolving and rotating spindle 176 in the same direction that frame 100 rotates. Fixed on the other end of spindle 176 is a bevel pinion gear 180 engageable with driven bevel gear 182 for rotating spindle 152 and sheave 142 in the counterclockwise direction shown. The transmission for driving sheave 144 at the same speed, but in the clockwise direction shown, includes the following elements which form pairs with the corresponding elements of the transmission just described: stationary gear 184 on bearing 126 around shaft 118, spindle 186 journalled in end wall 104 and the adjacent end wall (not shown) of gear box 164, driven spur gear 188 and driving bevel pinion gear 190 on spindle 186, and driven bevel gear 192 on spindle 162. Thus, as frame 100 rotates about its central longitudinal axis, which is coincident with the longitudinal die or cable axis, in the direction shown, sheaves 142, 144 rotate about their axes in the opposite directions shown and at the same speed as each other.

Continuing with FIGS. 3–5, cable C is wound around sheaves 142, 144 in such a manner that capstan assembly 12 provides most of the pulling force on the cable. While a single figure 8 path could be employed, it is preferred that cable C be wound in a double figure 8 path so that assembly 12 provides 75% of such pulling force, leaving only 25% for reel 18, in order to avoid damage to the cable.

As the cable emerges from shaft 116 after being formed in die 10, it is fed first through the groove in guide pulley 166, and then follows a double figure 8 path including a first arc *aa* (FIG. 5) of less than 180 degrees in groove *a* (FIG. 3) of sheave 142, a second arc *bb* of more than 180 degrees in groove *b* of sheave 144, a third arc *cc* of more than 180 degrees in groove *c* of sheave 142, a fourth arc *dd* of more than 180 degrees in groove *d* of sheave 144, a fifth arc *ee* of more than 180 degrees in groove *e* of sheave 142 and a sixth arc *ff* of less than 180 degrees in groove *f* of sheave 144. As cable C emerges from sheave 144 it is fed through the grooves in guide pulleys 170, 172 into shaft 118, eventually reaching flyer 14, as shown in FIGS. 1 and 2, whereupon it passes through shaft 34 and out of hub portion 50 around pulleys 56, 58 and is wound on reel 18.

During the operation of the cable takeup apparatus shown, the desired twist is imparted to cable C between die 10 and sheave 142 by the rotating frame 100 of capstan assembly 12 which is driven together with flyer 14 at the same speed and in the same direction shown, while reel 18 is driven separately in the same direction to takeup the cable. While such operation is characteristic of the conventional apparatus referred to above, the incorporation of sheave capstan assembly 12 into such apparatus has resulted in substantial improvements. As noted above, capstan assembly 12 now provides most of the pulling force on the cable, thereby avoiding damage to the cable and resulting in a substantial reduction in production costs. Moreover, the rotational speed of capstan assembly 12 has been increased to more than twice the corresponding speed of the conventional tractor type capstan, and the cable takeup speed has likewise been more than doubled, as compared with that attainable when using such conventional tractor capstan.

For example, when a cable C of about 1 inch diameter is fed over sheaves 142, 144 having pitch diameters of 24.44 inches in the double figure 8 path shown, with the sheaves rotating at 80 r.p.m., the capstan assembly 12 provides 75% of the pull on the cable, leaving only 25% for reel 18. When employing a conventional tractor capstan, the reel provides most of the pulling force on the cable with consequent damage thereto. Likewise, with frame 100 rotating at about 500 r.p.m. the cable travels at a takeup speed of about 530 f.p.m. The maximum speeds obtainable with the conventional tractor capstan are about 200 r.p.m. and about 240 f.p.m.

What is claimed is:

1. In cable takeup apparatus including a cable forming die, a takeup flyer rotatable about the longitudinal axis of said die, a takeup reel rotatably mounted on said flyer, a cable arranged to emerge from said die to be twisted about said longitudinal axis, and to be fed into said flyer to said reel, first drive means for rotating said flyer about said reel and longitudinal axis to maintain the twist in said cable, and second drive means for rotating said reel for winding said cable on said reel, the combination therewith of a sheave capstan assembly for twisting and feeding said cable from said die to said flyer, said capstan assembly comprising an elongated frame arranged between said die and flyer for rotation about said longitudinal axis with said flyer by said first drive means, first and second sheaves mounted on said frame for rotation about parallel transverse axes intersecting said longitudinal axis, with said first sheave being arranged to receive said cable from said die and said second sheave being arranged to feed said cable to said flyer, and sheave transmission means operatively associated with said assembly, frame and sheaves for rotating said sheaves in opposite directions as said frame rotates, each of said sheaves having at least two annular peripheral grooves through which said cable is fed in a figure 8 path including an arc of less than 180 degrees in one groove of said first sheave, an arc of more than 180 degrees in one groove of said second sheave, another arc of more than 180 degrees in another groove of said first sheave, and another arc of less than 180 degrees in another groove of said second sheave.

2. The combination of claim 1 wherein said frame includes a pair of transverse end walls extending across said longitudinal axis, an elongated housing connecting said end walls on one side of said longitudinal axis, counterbalancing means on said end walls on the other side and said longitudinal axis opposite said housing, and a central hollow shaft fixed in and projecting outwardly through each of said end walls along said longitudinal axis and through which said cable passes as it is fed from said die to said flyer, and wherein said capstan assembly also includes bearing means rotatably supporting said shafts, and capstan transmission means operatively associated with at least one of said shafts and said first drive means for rotating said frame to impart the desired twist to said cable as it passes from said die to said first sheave.

3. The combination of claim 1 wherein said sheaves are rotatably mounted on said frame along and adjacent said longitudinal axis, and wherein said capstan assembly also includes pulley means rotatably mounted on said frame between said first sheave and die and having groove means for guiding said cable into said one groove in said first sheave as it emerges from said die, and pulley means rotatably mounted on said frame between said second sheave and said flyer and having groove means for guiding said cable from said other groove in said second sheave along said longitudinal axis and toward said flyer.

4. The combination of claim 1 wherein said sheave transmission means includes first stationary gear means mounted on said assembly around said longitudinal axis, first spindle means mounted on said frame for revolution about said longitudinal axis and rotation about another axis parallel to said longitudinal axis, second gear means fixed on said first spindle means and engageable with said first gear means for revolving and rotating said first spindle means in the same direction that said frame rotates, second spindle means mounted on said frame for rotating said sheaves about said transverse axes, third gear means fixed on said second spindle means, and fourth gear means fixed on said first spindle means and engageable with said third gear means for rotating said sheaves in said opposite directions, as said frame rotates.

5. The combination of claim 1 wherein each of said sheaves has three annular peripheral grooves through which said cable is fed in a double figure 8 path including a first arc of less than 180 degrees in the first groove of said first sheave, a second arc of more than 180 degrees in the first groove of said second sheave, a third arc of more than 180 degrees in the second groove of said first sheave, a fourth arc of more than 180 degrees in the second groove of said second sheave, a fifth arc of more than 180 degrees in the third groove in said first sheave, and a sixth arc of less than 180 degrees in the third groove of said second sheave.

6. The combination of claim 5 wherein said frame includes a pair of transverse end walls extending across said longitudinal axis, an elongated housing connecting said end walls on one side of said longitudinal axis, counter-balancing means on said end walls on the other side of said longitudinal axis opposite said housing and a central hollow shaft fixed in and projecting outwardly through each of said end walls along said longitudinal axis and through which said cable passes as it is fed from said die to said flyer, and wherein said capstan assembly also includes bearing means rotatably supporting said shafts, and capstan transmission means operatively associated with both of said shafts and said first drive means for rotating said frame to impart the desired twist to said cable as it passes from said die to said first sheave.

7. The combination of claim 6 wherein said sheaves are rotatably mounted on said housing along and adjacent said longitudinal axis between said end walls, with said first groove in said first sheave lying in a plane containing said longitudinal axis and with the grooves in said second sheave being offset from the grooves in said first sheave toward the open side of said frame opposite said housing, and wherein said capstan assembly also includes a first pulley rotatably mounted on said housing between said first sheave and one of said end walls and having a groove lying in said plane for guiding said cable into said first groove in said first sheave as it emerges from one of said shafts, a second pulley rotatably mounted on said housing between said second sheave and the other of said end walls and having a groove lying in another plane intersecting said longitudinal axis and said third groove in said second sheave for guiding said cable from said third groove in said second sheave toward said longitudinal axis, and a third pulley rotatably mounted on said other end wall and having a groove lying in the plane of said transverse axes and centering on said longitudinal axis for guiding said cable from said second pulley along said longitudinal axis and into the other of said shafts and toward said flyer.

8. The combination of claim 7 wherein said sheave transmission means includes a first stationary gear pair severally mounted on said bearing means around said shafts beyond said end walls, a first spindle pair severally journalled in said housing for revolution about said longitudinal axis and rotation about another axis parallel to said longitudinal axis and severally having their one ends projecting through said end walls and their other ends arranged within said housing, a second gear pair severally fixed on said one ends of said first spindle pair and severally engageable with said first gear pair for severally revolving and rotating said first spindle pair in the same direction that said frame rotates, a second spindle pair severally journalled between said other ends of said first spindle pair in said housing for severally rotating said sheaves about said transverse axes, a third gear pair severally fixed on said second spindle pair, and a fourth gear pair severally fixed on said other ends of said first spindle pair and severally engageable with said third gear pair for severally rotating said sheaves in said opposite directions, as said frame rotates.

9. A sheave capstan assembly adapted to twist and feed a cable from a cable forming die to a takeup flyer in cable takeup apparatus, said capstan assembly comprising an elongated frame rotatable about a longitudinal axis adapted to be coincident with the longitudinal axis of the die, first and second sheaves mounted on said frame for rotation about parallel transverse axes intersecting said longitudinal axis, with said first sheave being adapted to receive the cable from the die and said second sheave being adapted to feed the cable to the flyer, and sheave transmission means operatively associated with said assembly, frame and sheaves for rotating said sheaves in opposite directions, as said frame rotates, each of said sheaves having at least two annular peripheral grooves through which the cable is adapted to be fed in a figure 8 path including an arc of less than 180 degrees in one groove of said first sheave, an arc of more than 180 degrees in one groove of said second sheave, another arc of more than 180 degrees in another groove of said first sheave, and another arc of less than 180 degrees in another groove of said second sheave.

10. The assembly of claim 9 wherein said frame includes a transverse pair of end walls extending across said longitudinal axis, an elongated housing connecting said end walls on one side of said longitudinal axis, counterbalancing means on said end walls on the other side of said axis opposite said housing, and a central hollow shaft fixed in and projecting outwardly through each of said end walls along said longitudinal axis and through which the cable is adapted to pass as it is fed from the die to the flyer, and wherein said capstan assembly also includes bearing means rotatably supporting said shafts, and capstan transmission means operatively associated with at least one of said shafts for continuously rotating said frame which is adapted to impart the desired twist to the cable as it passes from the die to said first sheave.

11. The assembly of claim 9 wherein said sheaves are rotatably mounted on said frame along and adjacent said longitudinal axis, and wherein said capstan assembly also includes pulley means rotatably mounted on said frame between said first sheave and one end of said frame and having groove means adapted to guide the cable into said one groove in said first sheave as it emerges from the die, and pulley means rotatably mounted on said frame between said second sheave and the other end of said frame and having groove means adapted to guide the cable from said other groove in said second sheave along said longitudinal axis and toward the flyer.

12. The assembly of claim 9 wherein said sheave transmission means includes first stationary gear means mounted on said assembly around said longitudinal axis, first spindle means mounted on said frame for revolution about said longitudinal axis and rotation about another axis parallel to said longitudinal axis, second gear means fixed on said first spindle means and engageable with said first gear means for revolving and rotating said first spindle means in the same direction that said frame rotates, second spindle means mounted on said frame for rotating said sheaves about said transverse axes, third gear means fixed on said second spindle means, and fourth gear means fixed on said first spindle means and engageable with said third gear means for rotating said sheaves in said opposite directions, as said frame rotates.

13. The assembly of claim 9 wherein each of said sheaves has three annular peripheral grooves through which the cable is adapted to be fed in a double figure 8 path including a first arc of less than 180 degrees in the first groove of said first sheave, a second arc of more than 180 degrees in the first groove of said second sheave, a third arc of more than 180 degrees in the second groove of said first sheave, a fourth arc of more than 180 degrees in the second groove of said second sheave, a fifth arc of more than 180 degrees in the third groove of said first sheave, and a sixth arc of less than 180 degrees in the third groove of said second sheave.

14. A sheave capstan assembly adapted to twist and feed a cable from a cable forming die to a takeup flyer in cable takeup apparatus, said capstan assembly comprising an elongated frame rotatable about a longitudinal axis adapted to be coincident with the longitudinal axis of the die, first and second sheaves mounted on said frame for rotation about parallel transverse axes intersecting said longitudinal axis, with said first sheave being adapted to receive the cable from the die and said second sheave being adapted to feed the cable to the flyer, and sheave transmission means operatively associated with said assembly, frame and sheaves for rotating said sheaves in opposite directions, as said frame rotates, each of said sheaves having three annular peripheral grooves through which the cable is adapted to be fed in a double figure 8 path including a first arc of less than 180 degrees in the first groove of said first sheave, a second arc of more than 180 degrees in the first groove of said second sheave, a third arc of more than 180 degrees in the second groove of said first sheave, a fourth arc of more than 180 degrees in the second groove of said second sheave, a fifth arc of more than 180 degrees in the third groove of said first sheave, and a sixth arc of less than 180 degrees in the third groove of said second sheave, said frame includes a pair of transverse end walls extending across said longitudinal axis, an elongated housing connecting said end walls on one side of said longitudinal axis, counterbalancing means on said end walls on the other side of said longitudinal axis opposite said housing, and a central hollow shaft fixed in and projecting outwardly through each of said end walls along said longitudinal axis and through which the cable is adapted to pass as it is fed from the die to the flyer, and wherein said capstan assembly also includes bearing means rotatably supporting said shafts about said longitudinal axis, and capstan transmission means operatively associated with both of said shafts for rotating said frame which is adapted to impart the desired twist to the cable as it passes from the die to said first sheave.

15. The assembly of claim 14 wherein said sheaves are rotatably mounted on said housing along and adjacent said longitudinal axis between said end walls, with said first groove in said first sheave lying in a plane containing said longitudinal axis and with the grooves in said second sheaves being offset from the grooves in said first sheave toward the open side of said frame opposite said housing, and wherein said capstan assembly also includes a first pulley rotatably mounted on said housing between said first sheave and one of said end walls and having a groove lying in said plane and adapted to guide the cable onto said first sheave as it emerges from one of said shafts, a second pulley rotatably mounted on said housing between said second sheave and the other of said end walls and having a groove lying in another plane intersecting said longitudinal axis and said third groove in said second sheave and adapted to guide the cable from said third groove in said second sheave toward said longitudinal axis, and a third pulley rotatably mounted on said other end wall and having a groove lying in the plane of said transverse axes and centering on said longitudinal axis and adapted to guide the cable from said second pulley along said longitudinal axis into the other of said shafts and toward the flyer.

16. The assembly of claim 15 wherein said sheave transmission means includes a first stationary gear pair severally mounted on said bearing means around said shafts beyond said end walls, a first spindle pair severally journalled in said housing for revolution about said longitudinal axis and rotation about another axis parallel to said longitudinal axis and severally having their one ends projecting through said end walls and their other ends arranged within said housing, a second gear pair severally fixed on said one ends of said first spindle pair and severally engageable with said first gear pair for severally revolving and rotating said first spindle pair in the same direction that said frame rotates, a second spindle pair severally journalled in said housing between said other ends of said first spindle pair for severally rotating said sheaves about said transverse axes, a third gear pair severally fixed on said second spindle pair, and a fourth gear pair severally fixed on said other ends of said first spindle pair and severally engageable with said third gear pair for severally rotating said sheaves in said opposite directions, as said frame rotates.

17. Apparatus in accordance with claim 1, wherein said frame includes hollow shaft means turnable with said frame and projecting along said longitudinal axis for guiding the cable as it is fed from said die to said flyer, bearing means for rotatably supporting said shaft means, and capstan transmission means operatively associated with said shaft means and said first drive means for rotating said frame to impart the desired twist to said cable as it passes from said die to said first sheave.

18. The assembly of claim 9 further including, central hollow shaft means fixed to said frame along said longitudinal axis and through which the cable is adapted to pass as it is fed from said die to said flyer, bearing means rotatably supporting said shaft means, and capstan transmission means operatively associated with said shaft means for rotating said frame to impart the desired twist to the cable as it passes from said die to said first sheave.

19. A sheave capstan assembly adapted to twist and feed a cable from a cable forming die to a takeup flyer in cable takeup apparatus, said capstan assembly comprising, an elongated frame rotatable about a longitudinal axis adapted to be coincident with the longitudinal axis of the die, said frame being continuously rotatable for applying the desired twist to said cable, first and second sheaves mounted on said frame for rotation about parallel transverse axes intersecting said longitudinal axis, with said first sheave being adapted to receive the cable from the die and said second sheave being adapted to feed the cable to the flyer, and sheave transmission means operatively associated with said assembly, frame and sheaves for rotating said sheaves in opposite directions, as said frame rotates, each of said sheaves having at least two annular peripheral grooves through which the cable is adapted to be fed in a figure 8 path including an arc of less than 180 degrees in one groove of said first sheave, an arc of more than 180 degrees in one groove of said second sheave, another arc of more than 180 degrees in another groove of said first sheave, and another arc of less than 180 degrees in another groove of said second sheave.

20. A sheave capstan assembly for twisting and feeding cable from a cable supply to a takeup flyer, said capstan assembly comprising, a frame continuously rotatable relative to the cable supply and about a longitudinal axis for applying a desired twist to the cable, a pair of sheaves mounted on said frame for rotation about parallel transverse axes intersecting said longitudinal axis, the first of said sheaves receives the cable from the supply and the second of said sheaves feeds the cable to the flyer, and sheave transmission means operatively associated with said assembly, frame and sheaves for rotating said sheaves in opposite directions, as said frame rotates, for supplying a major portion of cable pulling force to the cable to sustain cable twist and feed, each of said sheaves having at least two annular peripheral grooves through which the cable is adapted to be fed in a figure 8 path including an arc of less than 180 degrees in one groove of said first sheave, an arc of more than 180 degrees in one groove of said second sheave, another arc of more than 180 degrees in another groove of said first sheave, and another arc of less than 180 degrees in another groove of said second sheave.

21. A capstan assembly in accordance with claim 19 further including, means for rotating said frame about said longitudinal axis relative to the supply and with the takeup flyer for applying a continuous twist in one direction to the cable fed to the flyer.

References Cited

UNITED STATES PATENTS

| | | | |
|---|---|---|---|
| 545,033 | 8/1895 | Avis | 57—60 |
| 1,194,834 | 8/1916 | Good | 57—68 |
| 1,981,083 | 11/1934 | Sommerville | 57—71 XR |
| 2,398,865 | 4/1946 | Sommerville | 57—59 |
| 2,884,757 | 5/1959 | Davis | 57—165 |
| 2,944,379 | 7/1960 | Davis | 57—167 XR |
| 3,320,350 | 5/1967 | Corrall et al. | 57—64 XR |

JOHN PETRAKES, *Primary Examiner.*